US006557228B2

(12) United States Patent
Gruner

(10) Patent No.: US 6,557,228 B2
(45) Date of Patent: May 6, 2003

(54) GIMBAL BEARING REMOVER

(76) Inventor: James Vincent Gruner, 3716 E. University Dr., #2023, Mesa, AZ (US) 85205

(*) Notice: Subject to any disclaimer, the term of this patent is extended or adjusted under 35 U.S.C. 154(b) by 0 days.

(21) Appl. No.: 09/769,563

(22) Filed: Jan. 25, 2001

(65) Prior Publication Data

US 2001/0037547 A1 Nov. 8, 2001

Related U.S. Application Data

(60) Provisional application No. 60/179,040, filed on Feb. 1, 2000.

(51) Int. Cl.[7] ................................................ B23P 19/04

(52) U.S. Cl. ........................................... 29/263; 29/265

(58) Field of Search .......................... 29/263, 265, 259, 29/258

(56) References Cited

U.S. PATENT DOCUMENTS

| | | | | | |
|---|---|---|---|---|---|
| 1,496,303 | A | * | 6/1924 | Dieringer | 29/265 |
| 3,241,223 | A | * | 3/1966 | Anderson | 29/259 |
| 5,848,460 | A | * | 12/1998 | Rasmussen et al. | 29/263 |

* cited by examiner

*Primary Examiner*—Robert C. Watson

(57) ABSTRACT

A tool primarily designed for the quick and easy removal the gimbal bearing found in Mercruiser styled Stern Drives. The tool consists of a fixed hook with a sliding mechanism that automatically locks the bearing onto the hook, a flange that bridges the opening of the bell housing, a threaded rod that is attached to the end of the hook body and passes through the center of the flange, a thrust bearing, a long threaded nut that provides the moving force behind the tool as well as a handle for inserting the tool, and a torque arm that keeps the tool from rotating while the nut is being tightened.

3 Claims, 7 Drawing Sheets

GIMBAL BEARING REMOVER

CROSS REFERENCE

Provisional application No. 60/179,040 filed Feb. 1, 2000.

STATEMENT REGARDING FEDERALLY SPONSORED RESEARCH

Not Applicable

REFERENCE TO MICROFICHE APPENDAGE

Not Applicable

FIELD OF INVENTION

This invention pertains to the removal of gimbal bearings used in marine propulsion systems known as stern drives.

DESCRIPTION OF PRIOR ART

A gimbal bearing is located in a housing known as a transom bracket, and is press fit into said bracket. The bearing is shrouded by another housing known as a bell housing which is attached to the transom bracket with pins, hoses and cables. The result is a bearing that is difficult to access through the bell housing, and time consuming to access by removing the bell housing. Existing methods rely largely on universal pullers with multiple fingers or jaws that expand behind the bearing and are attached to a slide hammer or a screw and plate arrangement. These methods require a time consuming and difficult set up of a tool within the restrictive and often greasy confines of the bell housing. The fingers frequently cannot support the load needed to remove the bearing and flex and come out of the bearing before it can be removed, requiring a repeat set up. Slide hammers sometimes do not have the force needed to jar the bearing loose. Plate and screws methods are generally more difficult to set up than the slide hammer.

SUMMARY OF THE INVENTION

The present invention consists of a fixed hook that is pushed through the center of the bearing to be removed. Once the hook has passed through the bearing, the hook automatically locates itself behind the bearing, propelled by forces generated by a spring loaded slide locking mechanism. Once the bearing is properly located, the locking mechanism itself automatically passes through the center of the bearing, effectively taking up all of the space within the inside diameter of the bearing. This makes it impossible for the hook to escape from behind the bearing until the lock is manually released.

A threaded rod is attached to the opposite end of the hook body. An offset arm is also located on the same end of the hook body.

A flange is used to bridge across the opening of the bell housing. This flange provides the platform necessary for the removing force to be transmitted to the bearing. The flange is specifically shaped to fit over the studs on the bell housing.

The threaded rod is passed through the center of the flange. The offset arm referred to as the torque arm passes through a hole offset to one side of the flange. The torque arm prohibits the hook body from rotating.

A thrust bearing is mounted on the nut side of the flange. An abnormally elongated nut is threaded onto the threaded rod. The nut is elongated for three purposes; first it provides the extra threaded surface area needed to support the required loads. Second, it provides a handle for controlling the tool. Third, it absorbs the threaded rod as the nut is tightened as to prevent the threaded rod from interfering with the tool used to tighten it.

As the nut is tightened, the distance between the hook body and the flange is reduced, this removes the bearing from its housing.

A handle on the slide locking mechanism is provided to manually release the lock from the center of the bearing, allowing the bearing to pass back over the hook and off the tool.

The present invention solves the problems of prior art by providing a completely automatic setup within the bell housing, as well as eliminating flexing problems by utilizing the inside diameter of the bearing to support the hook. The present invention utilizes the benefits of a screw and plate extraction system over a slide hammer without any of the set up problems associated with existing plate and screw type pullers.

DESCRIPTION OF THE PREFERRED EMBODIMENT

Figure 1:
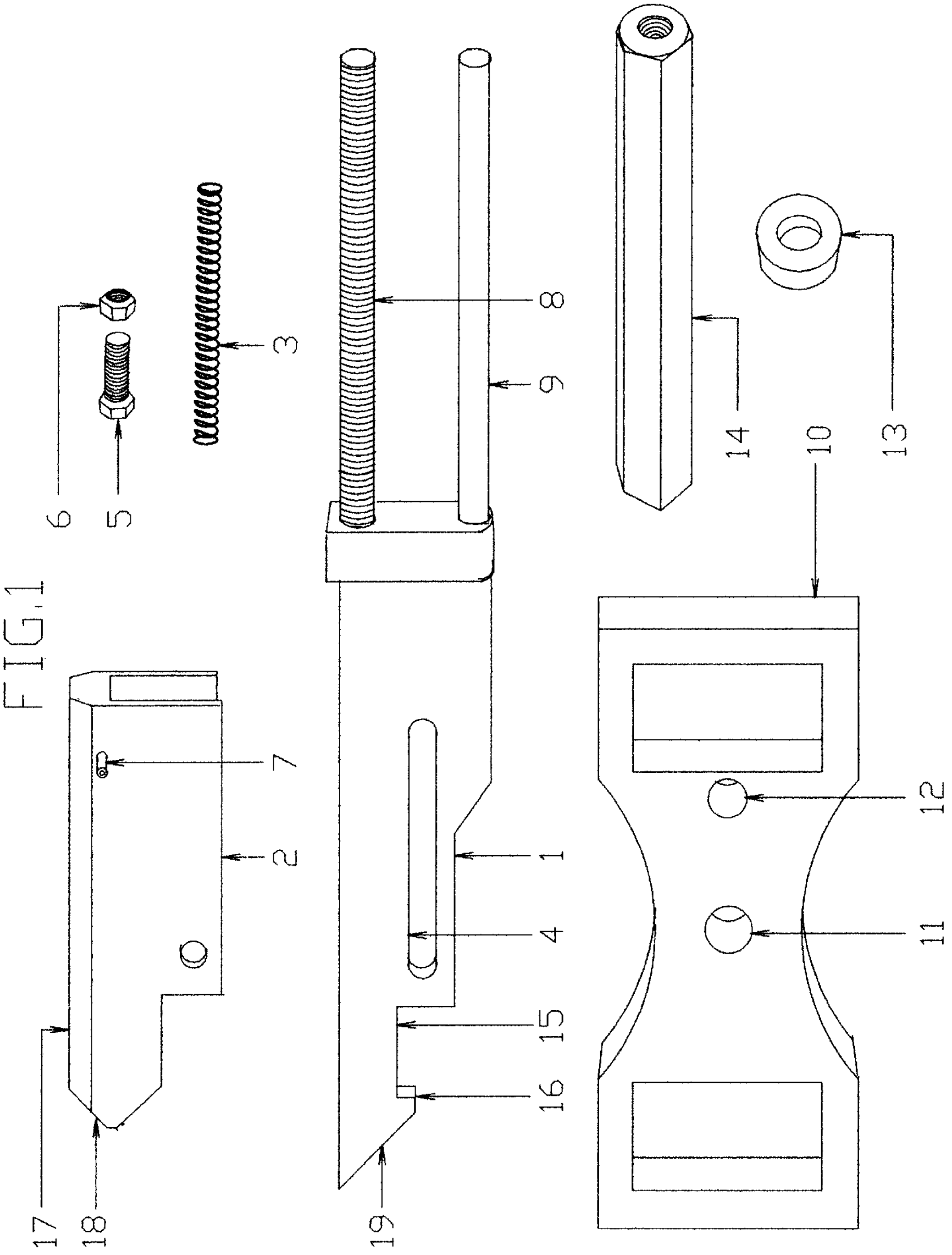
FIG. 1 depicts individual parts and features of the GIMBAL BEARING REMOVER.
Figure 3:
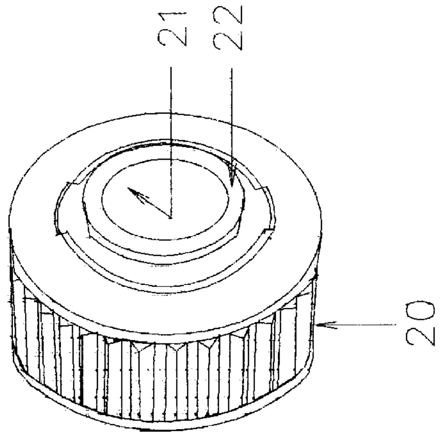
FIG. 3 depicts a gimbal bearing and its engagement surfaces.
Figure 2:
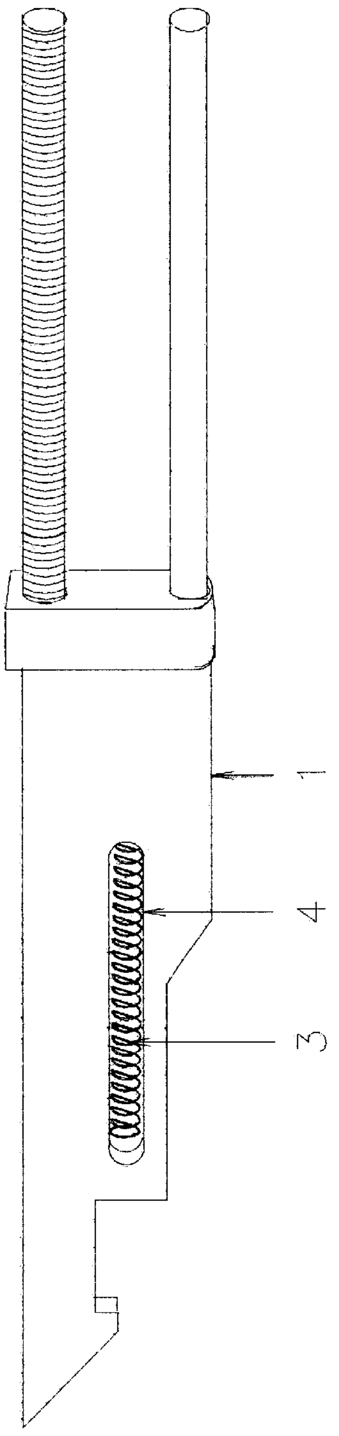
FIG. 2 depicts the spring location within the tool body.
Figure 4:
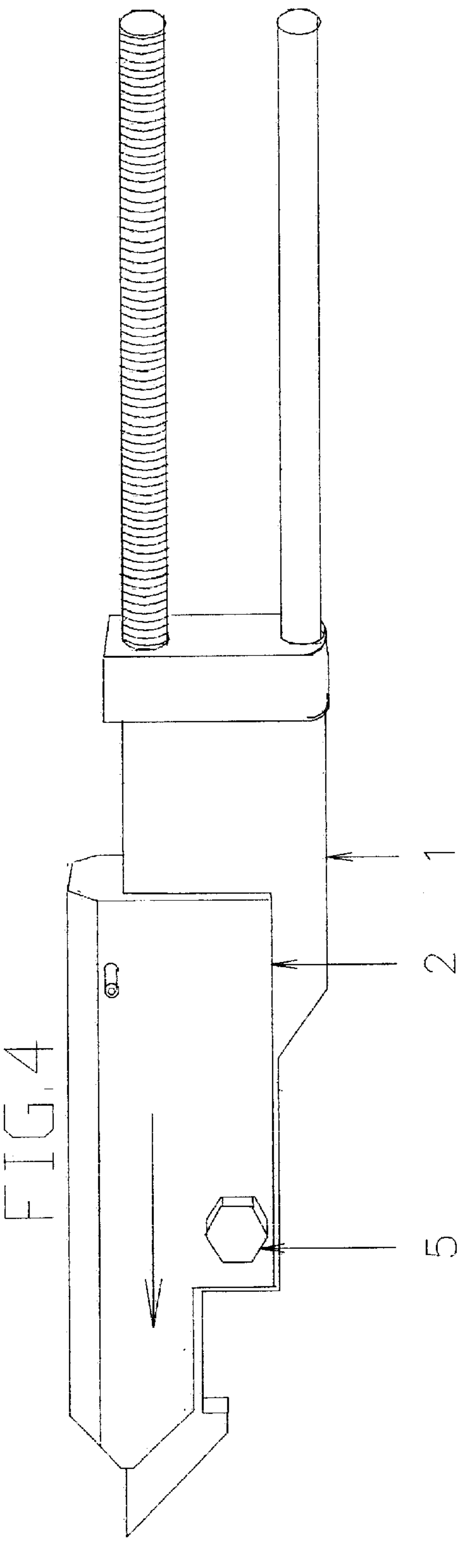
FIG. 4 depicts the tool body with the locking mechanism installed.
Figure 5:
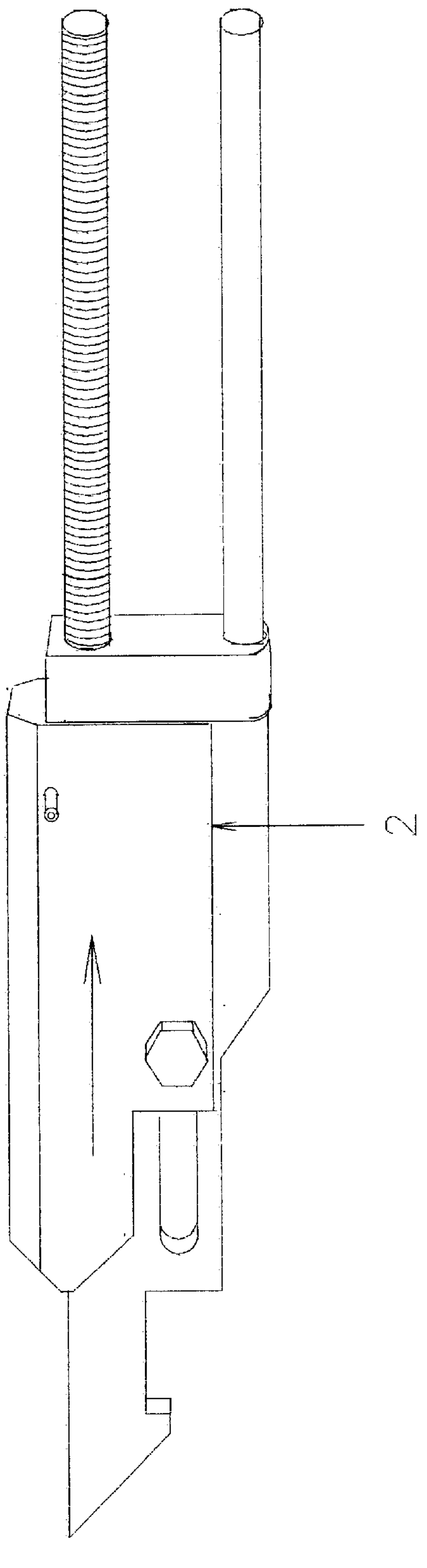
FIG. 5 depicts the tool body with the locking mechanism in the unlocked position.
Figures 6, 7, 8:
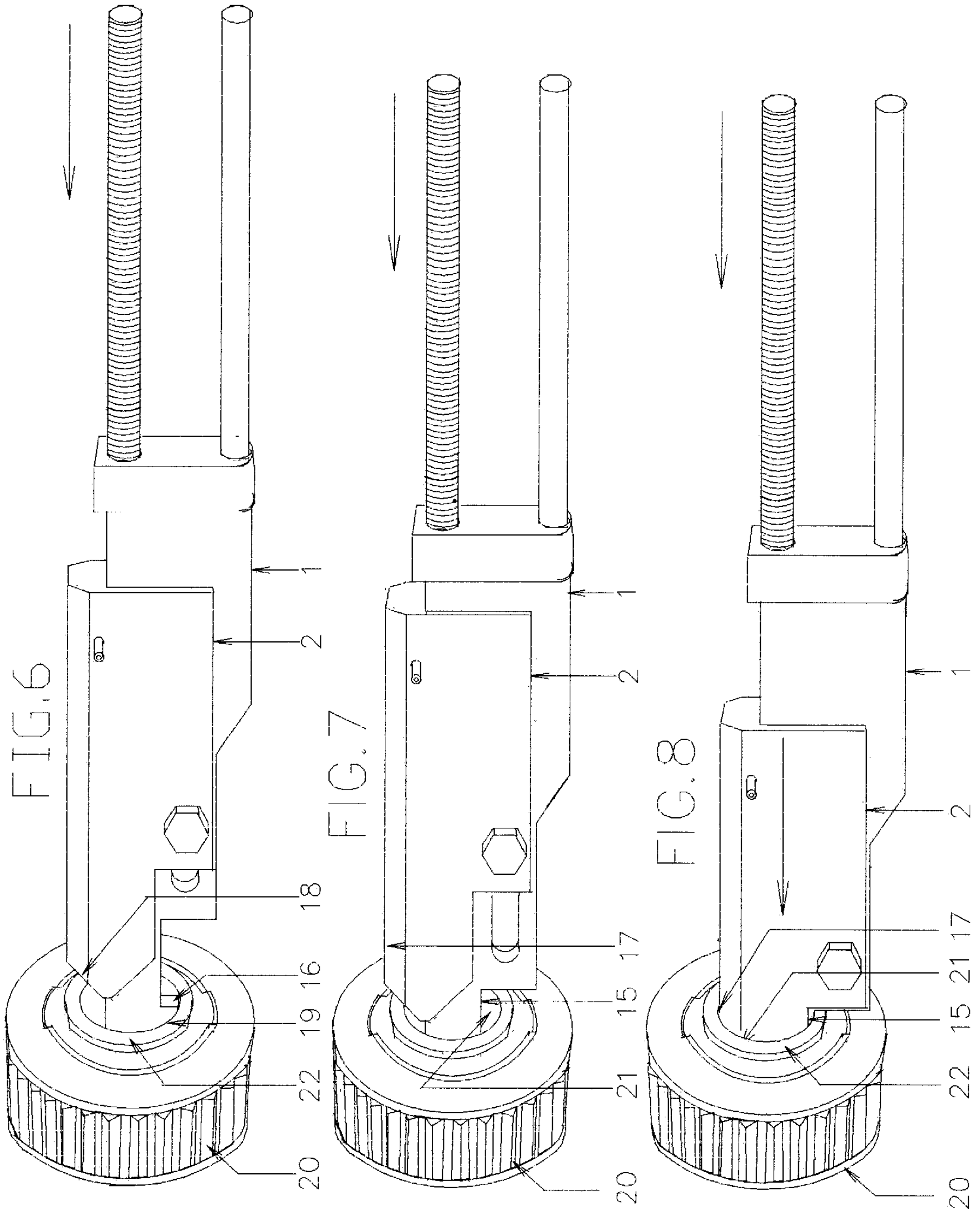
FIG. 6 depicts the tool body entering a gimbal bearing.
FIG. 7 depicts the tool body passing through a gimbal bearing.
FIG. 8 depicts the final engagement position of the tool body and the locking mechanism sliding into its lock position.
Figure 9:
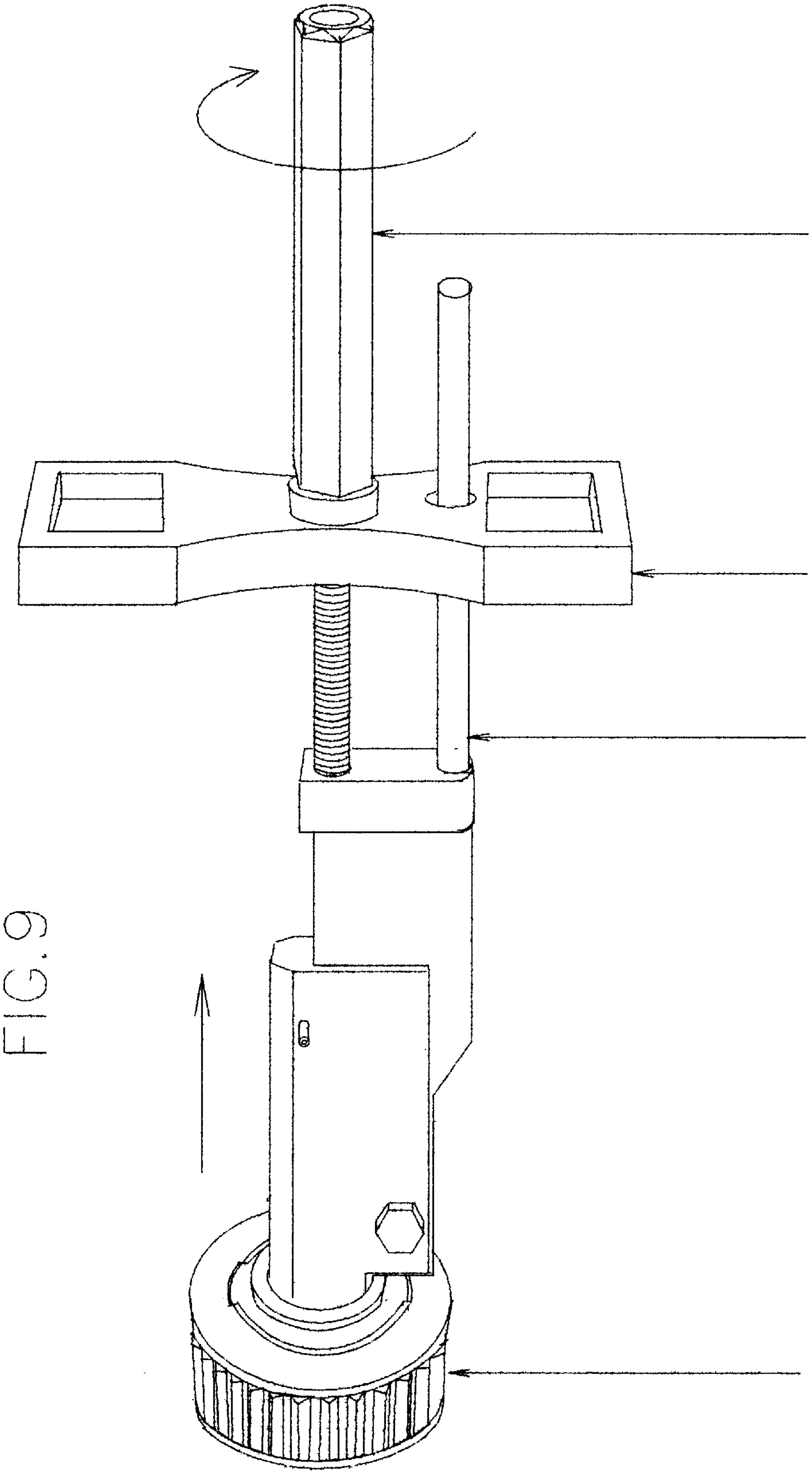
FIG. 9 depicts the complete tool with removal forces being applied to a gimbal bearing.
Figure 10:
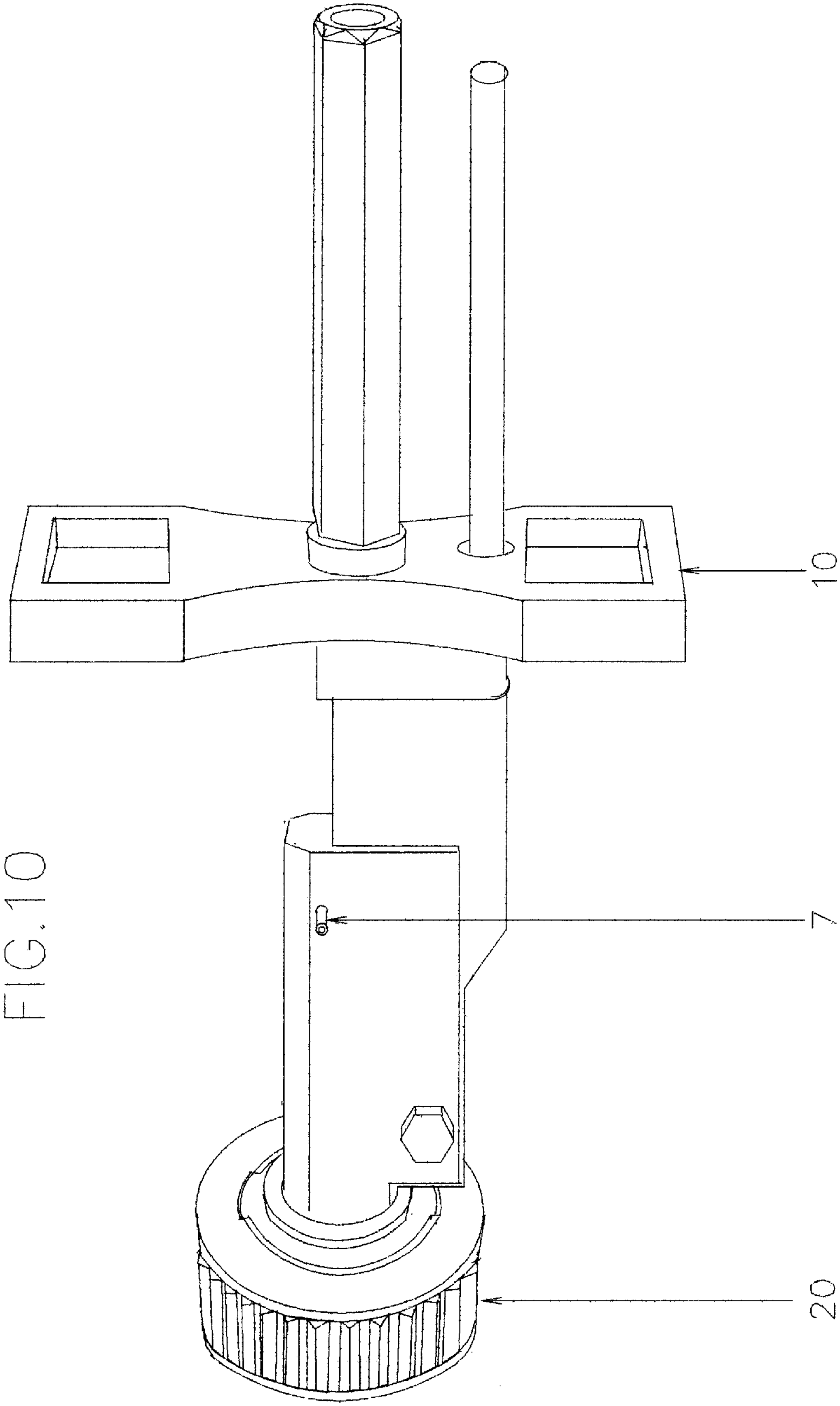
FIG. 10 depicts the complete tool position at the end of the removal process.
Figure 11:
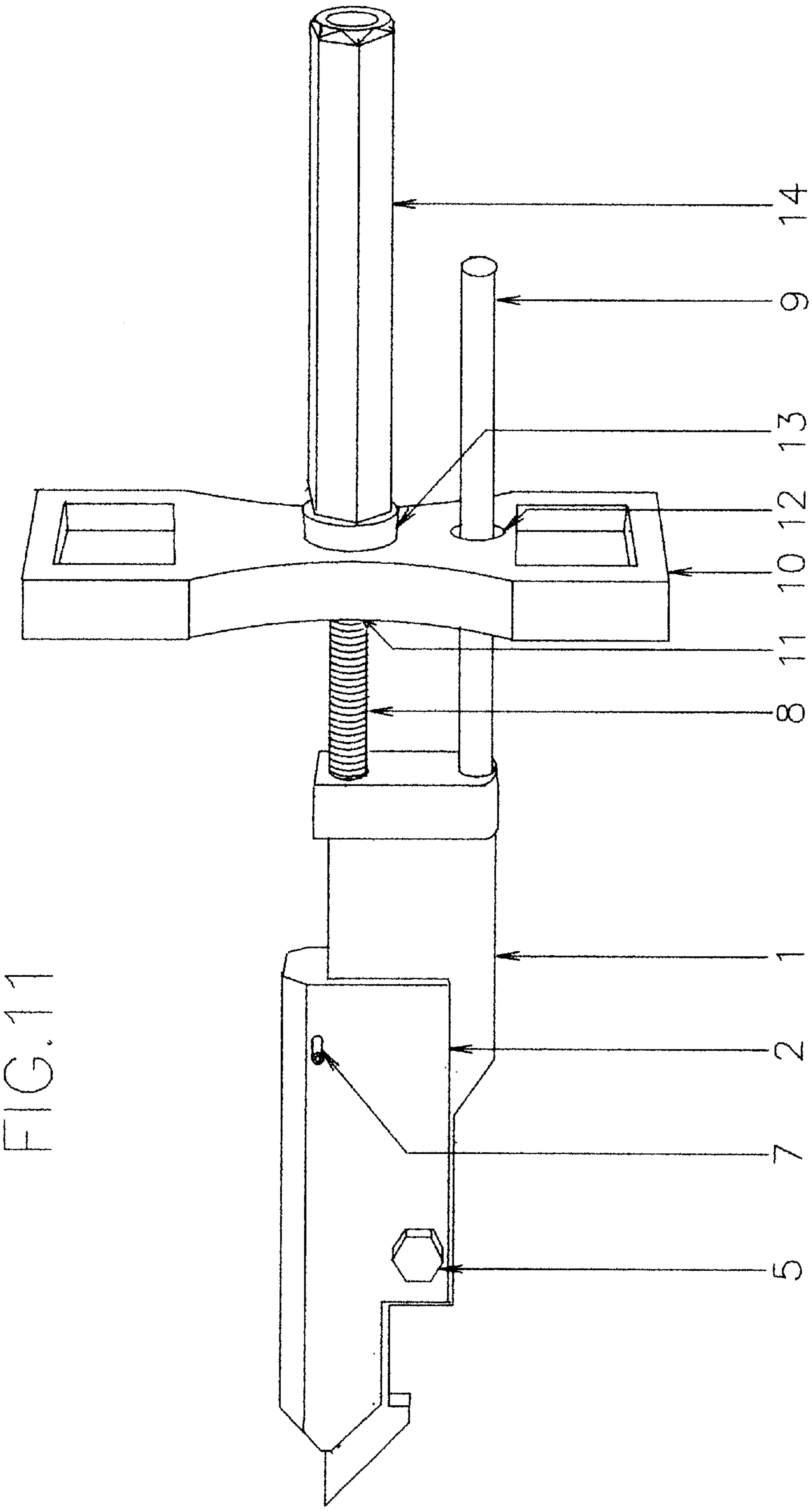
FIG. 11 depicts a complete gimbal bearing remover in standard configuration.

A tool for removing gimbal bearings or similar objects, the tool being constructed primarily of steel, parts and feature references seen in FIG. 1. A spring 3 fits within the slot 4 of the tool body as seen in FIG. 2. The slide locking mechanism 2 fits over the tool body 1 and rests on the tool body's straight edge. The sides of the slide locking mechanism 2 cover the slot 4, confining the spring 3 within. A bolt 5 passes through the holes within the slide locking mechanism sides and slot 4, and is secured by nut 6, retaining the slide locking mechanism 2 to tool body 1. The spring 3 is positioned between the bolt 5 and the rearward end of slot 4 which bears a constant spring force to bolt 5 towards the beveled end of tool body 1. The slide locking mechanism retainer (bolt 5 and nut 6) transfers the spring force to the slide locking mechanism 2, the above assembly seen in FIG. 4. The slide locking mechanism can be forced rearward FIG. 5 with spring pressure returning it to the forward position FIG. 4 when the force is removed. A handle 7 is attached to the slide locking mechanism 2 to ease manual operation. A threaded member 8 is attached to the rearward end of tool body 1. A torque arm 9 is also attached to the rearward end of tool body 1. The threaded member 8 and torque arm 9 pass through the bores 11 and 12 respectively within flange 10. A thrust bearing 13 fits over the threaded member 8. An elongated nut 14 threads onto the threaded member 8 to complete the entire assembly as seen in FIG. 11.

I claim:

1. An automatic locking device for removing bearings or similar objects comprising, a tool body, a slide locking mechanism, a slide locking mechanism retainer and a spring, said tool body being elongated and substantially flat, said tool body having a forward end that is beveled, and a rearward end to which a removing device attaches, said tool body having a straight edge that runs longitudinally from the foremost point of said bevel to said rearward end, said tool body having detent area on the edge that opposes said straight edge, said detent being positioned towards the forward end of said tool body, said tool body being hollowed by a slot, said slide locking mechanism being longitudinally slidable along the straight edge of said tool body, said slide locking mechanism having a beveled end positioned towards the forward end of said tool body, said slide locking mechanism having sides sufficient in size to cover said slot within said tool body, said slide locking mechanism retainer securing said slide locking mechanism to said tool body without hindering the required slidable movement, said spring transmitting a constant movable force to said slide locking mechanism towards the forward end of the said tool body.

2. The device of claim 1 wherein said device has a flange, a threaded member, a thrust bearing, a nut and a torque arm, said flange having a flat hourglass shape wherein said flange has a central bore and an off center bore, said threaded member protruding rearward from the rearward end of said tool body and passing through said central bore, said thrust bearing being positioned between said flange and said nut, said nut being sufficiently elongated to absorb said threaded member when tightened, said torque arm protruding rearward from the rearward end of said tool body and passing through said off center bore, said torque arm preventing said tool body from rotating.

3. The device of claim 1 wherein said slide locking mechanism has a handle.

* * * * *